May 30, 1933.  I. B. NIELSEN  1,911,642
GREASE DISPENSING DEVICE
Filed April 14, 1930
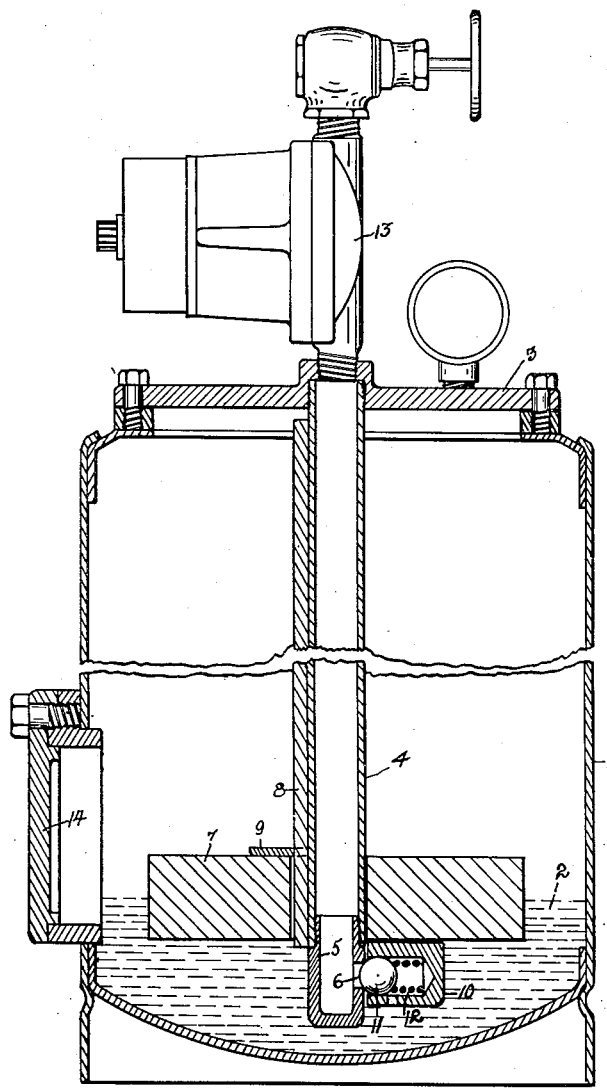
Inventor
Iver B. Nielsen
By Owen & Owen
Attorneys Patented May 30, 1933

1,911,642

UNITED STATES PATENT OFFICE

IVER B. NIELSEN, OF BRYAN, OHIO, ASSIGNOR TO THE ARO EQUIPMENT CORPORATION, OF BRYAN, OHIO, A CORPORATION OF OHIO

GREASE DISPENSING DEVICE

Application filed April 14, 1930. Serial No. 443,958.

This invention relates to a device for dispensing grease and has for its object to provide a dispensing device for grease or the like, where grease may be discharged from a container through a measuring device and air pressure may be maintained in the container to force the grease therefrom, and means may be provided to prevent the compressed air from passing out through the discharge orifice intended for the grease.

The principle and operation of the invention will be described in connection with the accompanying drawing which illustrates one embodiment thereof.

Fig. 1 is a section of a device embodying a preferred form of the invention, and Figs. 2, 3 and 4 are detail views showing some possible modifications.

In Fig. 1 there is shown a receptacle 1 adapted to contain grease 2 or the like. The upper end of the receptacle or container is ordinarily sealed by a cover 3 from which there depends a pipe 4. A tip 5 is screwed into the lower end of pipe 4 and is provided with a lateral inlet opening 6.

Surrounding pipe 4 there is a float 7. A guide member 8 is attached to one side of pipe 4 and a notched plate 9 attached to the top of float 7 acts as a wear plate to accurately position the float with respect to guide 8.

To the bottom of float 7 there is attached a valve casing 10 for a ball valve 11 normally pressed towards tube 4 by a spring 12. The upper end of pipe 4 is adapted to discharge grease through a suitable measuring device 13. The side of receptacle 1 may be provided with a removable plate 14 for furnishing access to the interior of the container without disturbing its connection to the measuring device.

The operation of the construction is as follows:

Grease being introduced into the container in sufficient amount, float 7 moves upward to floating position with respect to the top of the grease, ball 11 rolling up the side of tube 4 during this movement. This leaves inlet 6 open. Compressed air being introduced into the upper portion of the container presses grease through opening 6 into tip 5 and thence upward through pipe 4 and through the measuring device 13, whenever the outlet is opened. As the grease is discharged through the measuring device, the float lowers with the lowering level of the grease, ball 11 rolling down along the side of pipe 4. When the grease is exhausted to such an extent that the lowering float brings ball 11 into alignment with outlet 6, the discharge of grease is stopped.

If there were not some such means for closing the outlet when the grease was lowered to a predetermined extent, there would be nothing to prevent the air from rushing through the inlet and out through the discharge pipe and measuring device, whereby discharged air would be measured in place of grease. With the construction described, this cannot occur, the only material discharged being the grease.

In the form shown in Fig. 2, receptacle 1ª is provided with an outlet opening 14 which may lead to a suitable measuring device, not shown. A float 7ª is provided on its underside with a valve projection 15, adapted to close the outlet opening when the float is sufficiently lowered.

In the construction shown in Fig. 3, receptacle 1ᵇ is provided with an outlet opening 16 near the bottom of one side, and a float 7ᵇ is provided with a valve casing 10ᵇ carrying a ball valve 11ᵇ adapted to close the outlet opening when the float is lowered. The float engages a guide member 8ᵇ attached to the wall of the receptacle, and is maintained thereby in the proper angular relation with the receptacle so that the ball valve closes the outlet opening when the float is lowered.

The operation of the devices shown in Figs. 2 and 3 is so similar to that of the device shown in Fig. 1 that further description of the operation is unnecessary.

In the device shown in Fig. 4, receptacle 1ᶜ is provided near its bottom with an outlet opening 17 which may be connected to any suitable measuring device, not shown. In this form, there is a valve 18 hinged at 19 to the outlet pipe, and held in either closed or open position by a spring 20 attached to the receptacle at 21 and to the hinge at 22. Float 7ᶜ carries a projection 23 in operative relation to a lug 24 on the valve. In the drawing, the float is shown in its lowered position, with the valve closed. When grease is introduced into the receptacle, the float rises and projection 23 engages lug 24 and opens the valve. As the float rises, projection 23 remains in engagement with lug 24 until the valve is opened enough to bring the line from 21 to 22 above hinge 19, after which spring 20 maintains the valve in open position until discharge of material allows the float to be lowered so that projection 23 engages valve 18. This engagement by the descending float swings the valve towards closing position until the line between attachments 21 and 22 drops below hinge 19, after which the valve snaps shut. Guide 8ᶜ insures that the float will remain in position to carry projection 23 in proper relation to lug 24.

It will be readily understood that, in each of the forms, the bodily movement of the float in a guided direction results in opening and closing the valve, while the float is free to move upward or downward in the upper part of the receptacle without regard to any discharge opening, and that other valve constructions besides those shown might be used with a float moving in this manner. The structure shown in Fig. 1 is the preferred form, but the broader claims are intended to cover all modifications within the natural meaning of their terms.

What I claim is:

1. A container for grease having an outlet opening in the lower portion thereof and connected with a measuring device, a float free to move vertically within the container, a ball valve carried by the float, and a guide for the float maintaining the float in the position necessary to hold the valve in the vertical plane of the outlet.

2. In a container for grease having an outlet connected with a measuring device, a discharge tube extending downwardly to a point near the bottom of the grease chamber, a member adapted to float upon the surface of the grease and guided in its movement by said tube, an inlet from the container into the tube near the bottom of the tube, and means connected to the float sliding across and closing the inlet against the entrance of grease when the float is lowered to a predetermined point.

3. In a grease dispensing device, a container having a cover with a central opening, a measuring device attached to the outside of said opening, a tube extending from the inside of said opening to a point near the bottom of the container, the bottom of the tube being closed and there being an inlet opening through the side of the tube adjacent its bottom, a float surrounding said tube, a vertical guide member on the tube along which said float is guided in its upward and downward movement, a valve casing attached to the float and having an opening in its side adjacent the tube, a ball in the casing and a spring normally pressing the ball towards the tube, the said guide member maintaining the float in such angular position about the tube that the ball is maintained in vertical alignment with said inlet opening.

4. In a device of the character described, a container having an air-tight upper portion and an outlet opening near its bottom, a measuring device connected with the outlet, a float in the container, and a ball valve carried by the float and lowered by the float into position to close said outlet opening when the contents of the container reaches a predetermined low level.

5. A container for grease having an outlet opening near its bottom and a substantially vertical wall above the opening, a float adapted to move vertically adjacent said wall, and a ball valve carried by the float and rolling against said wall during the vertical movement of the float and into closing relation with said opening at the lower limit of the movement of the float.

In testimony whereof I have hereunto signed my name to this specification.

IVER B. NIELSEN.